R. EICHLOFF.
MILKING PAIL.
APPLICATION FILED NOV. 4, 1911.

1,051,871.

Patented Feb. 4, 1913.

Witnesses:
M. Hamilton.
M. Reimer.

Inventor:
Robert Eichloff
by his attorneys
Hamilton & Hamilton
James Hamilton

COLUMBIA PLANOGRAPH CO., WASHINGTON, D. C.

UNITED STATES PATENT OFFICE.

ROBERT EICHLOFF, OF GREIFSWALD, GERMANY.

MILKING-PAIL.

1,051,871.  Specification of Letters Patent.  Patented Feb. 4, 1913.

Application filed November 4, 1911. Serial No. 658,498.

*To all whom it may concern:*

Be it known that I, ROBERT EICHLOFF, a subject of the King of Prussia, residing at Greifswald, in the Kingdom of Prussia and Empire of Germany, have invented certain new and useful Improvements in Milking-Pails, of which the following is a specification.

My invention relates to improvements in milking pails, and more particularly in milking pails of that class in which the streams of milk drawn from the udder of the cow are collected by means of a funnel having its inlet at the side so as to form a hood by means of which any dirt or other foreign matter is prevented from falling into the pail. As the funnel is thus opening to the side, it happens that in the milking operation a stream of milk does not get into the pail, but flows on the ground. Furthermore, the first streams of the milk which ordinarily contain many bacteria should always be kept separate from the clean milk, for which purpose they are frequently directed to the ground. As now practised, these parts of the milk are wasted, though they might well be used for certain purposes in which perfect cleanliness is not imperative.

The object of my improvements is to construct the milking pail in such a way, that also the milk which is now wasted is gathered. For this purpose the top of the pail on which the funnel is mounted is constructed in the form of or provided with a receptacle adapted to gather the milk which is by accident or intentionally directed away from the opening of the funnel. In the preferred form the said receptacle is made removable from the pail, so that the milk gathered therein can easily be poured out without tilting the whole pail. Thereby the capacity of the subsidiary receptacle can be comparatively small.

For the purpose of explaining the invention more in detail two examples embodying the same have been shown in the accompanying drawing in which the same letters of reference have been used in all the views to indicate corresponding parts.

Figure 1:
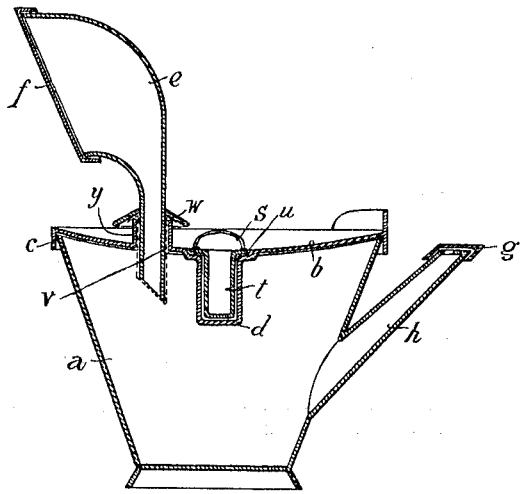
Figure 2:
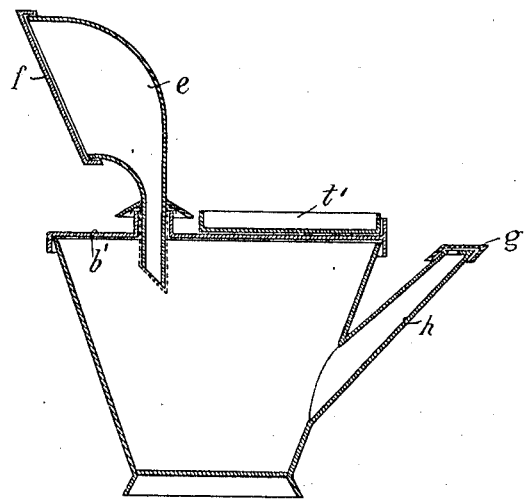

In said drawing Figure 1, is a vertical cross-section of the milking pail, and Fig. 2, is a similar cross-section showing a modification of the pail.

Referring more particularly to the example illustrated in Fig. 1 my improved milking pail consists of a body portion $a$ of any known or preferred construction. As shown the pail is closed at its top by a removable cover $b$ which is formed with a flange $c$ tightly inclosing the upper margin of the pail, and which is made shallow to form a flat trough. From the lowest part of the cover $b$ a cylinder $d$ extends downward and into the pail, which cylinder is closed at its bottom and open at its top, so as to form a cavity. Within the latter a cup $t$ or the like may be placed which is adapted to gather the milk which falls on the cover $b$. The cup $t$ is provided with a bail $s$ or another suitable handle by means of which it may readily be removed from the cylinder $d$. At its upper margin it is provided with a flange $u$ which bears tightly on the cover $b$, so that only a minimum of milk can flow into the casing $d$. The cover $b$ is further formed with a small opening $v$ surrounded by an upwardly projecting flange $y$ which is adapted to receive a funnel $e$. As shown the said funnel opens sidewise, so that its wall forms a hood extending over the opening $v$ and preventing any impurities or foreign matter from falling into the pail. In the preferred form shown in the drawing the inlet opening of the funnel is inclined in such a way, that the upper wall of the funnel extends with its margin above the said opening. Thereby the opening is protected in a better way against impurities or other foreign matter, and it may be closed by a lid $f$. Above the inlet opening $v$ an inclined flange $w$ is secured to the funnel, whereby any milk that might flow downward on the outer surface of the funnel is prevented from passing through the opening $v$ and into the pail. The spout $h$ of the pail is adapted to be closed by a lid $g$.

When using my improved milking pail the cover $b$ is put thereon, the spout $h$ is closed by the lid $g$, the funnel $e$ is brought into position, and the cup $t$ is placed into the cavity $d$. The first parts of the milk from each cow are directed on the cover $b$ from which they flow into the cup $t$. The main part is directed into the funnel $e$ from which the lid has before been removed. By reason of the inclined inlet opening of the funnel, no foreign matter can get into the pail. Should by inadvertence a stream of milk not get into the funnel $e$, it will fall on the cover $b$ from which it flows into the receptacle $t$. When the receptacle $t$ is full, it is removed from the pail and poured out into another receptacle. Also when pouring out the clean milk through the spout $h$ the receptacle $t$ with the spoiled milk contained therein is preferably removed because otherwise the spoiled milk might flow out of the receptacle $t$ and combine with the clean milk from the pail.

In Fig. 2 I have shown an example in which the cup $t^1$ for taking up the spoiled milk has a flat and broad form. As shown the cup covers the whole surface of the pail at the rear of the funnel. Thereby with the same capacity of the cup the capacity of the pail is increased. Furthermore it is not necessary to make the cover $b^1$ shallow, but the cup can directly be placed on the cover $b^1$. As the cup $t^1$ is removed before emptying the pail, the clean milk is not mixed with the spoiled milk. The form of the cup corresponds to that of the cover of the pail, so that the milk which does not get into the funnel $e$ falls into the cup $t^1$.

While in describing the invention reference has been made to a pail the cover of which is equipped with a funnel, I wish it to be understood, that my invention is not limited to the illustrated form of the pail or of the receptacle for collecting the spoiled milk. Under circumstances the pail may be used without the funnel, in which case the milk is directly milked into the opening $v$.

I claim herein as my invention:

1. The combination with a milking pail having a closed top, and an inlet opening, for the milk, of a receptacle removably connected with said pail and adapted to gather the milk which does not flow into the pail; the interior of the pail and said inlet opening being free from and securely closed against communication with said receptacle.

2. The combination with a milking pail having a closed top, and an inlet opening in said top for the milk, of a receptacle removably connected with said top and adapted to gather the milk which does not flow into the pail; the interior of the pail and said inlet opening being free from and securely closed against communication with said receptacle.

3. The combination with a milking pail having a closed shallow top, and an inlet opening in said top for the milk, said top being formed at its deepest part with a cavity, of a receptacle which is removably fitted in said cavity and arranged to gather the milk which falls on the top, the interior of the pail and said inlet opening being free from and securely closed against communication with said cavity and receptacle.

In testimony whereof I affix my signature in presence of two witnesses.

ROBERT EICHLOFF.

Witnesses:
PAUL SCHULZ,
EMIL SCHMIDT.

---

Copies of this patent may be obtained for five cents each, by addressing the "Commissioner of Patents, Washington, D. C."